(12) United States Patent
Numano

(10) Patent No.: US 7,194,631 B2
(45) Date of Patent: Mar. 20, 2007

(54) INFORMATION-PROCESSING APPARATUS HAVING A USER-SWITCHING FUNCTION AND USER-SWITCHING METHOD FOR USE IN THE APPARATUS

(75) Inventor: Fujihito Numano, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 814 days.

(21) Appl. No.: 10/320,604

(22) Filed: Dec. 17, 2002

(65) Prior Publication Data

US 2003/0182586 A1    Sep. 25, 2003

(30) Foreign Application Priority Data

Mar. 20, 2002   (JP)   .............................. 2002-079619

(51) Int. Cl.
*H04L 9/00*    (2006.01)
*H04K 1/00*    (2006.01)
*G06F 7/04*    (2006.01)
*G06F 17/30*   (2006.01)
*G06K 9/00*    (2006.01)

(52) U.S. Cl. .................... 713/183; 726/28; 713/166
(58) Field of Classification Search ............... 713/166; 726/28
See application file for complete search history.

(56) References Cited

U.S. PATENT DOCUMENTS

| 6,195,696 | B1 * | 2/2001 | Baber et al. ................ 709/223 |
| 6,202,066 | B1 * | 3/2001 | Barkley et al. ................ 707/9 |
| 6,463,459 | B1 * | 10/2002 | Orr et al. .................... 709/203 |
| 6,512,526 | B1 * | 1/2003 | McGlothlin et al. ........ 715/762 |
| 2002/0073320 | A1 * | 6/2002 | Rinkevich et al. .......... 713/183 |
| 2003/0069919 | A1 * | 4/2003 | Takahashi et al. .......... 709/108 |
| 2004/0172397 | A1 * | 9/2004 | Asherman ...................... 707/9 |
| 2005/0055306 | A1 * | 3/2005 | Miller et al. .................. 705/37 |

* cited by examiner

*Primary Examiner*—Christopher Revak
*Assistant Examiner*—Arezoo Sherkat
(74) *Attorney, Agent, or Firm*—Finnegan, Henderson, Farabow, Garrett & Dunner, L.L.P.

(57) ABSTRACT

An information-processing apparatus comprises a unit for determining an authority level of a user who has demanded user switching, a unit for displaying on a display of the apparatus a list of users who have authority levels not higher than the determined authority level, and a unit for switching an operation environment of an apparatus to the operation environment corresponding to a user selected from the list displayed.

17 Claims, 6 Drawing Sheets

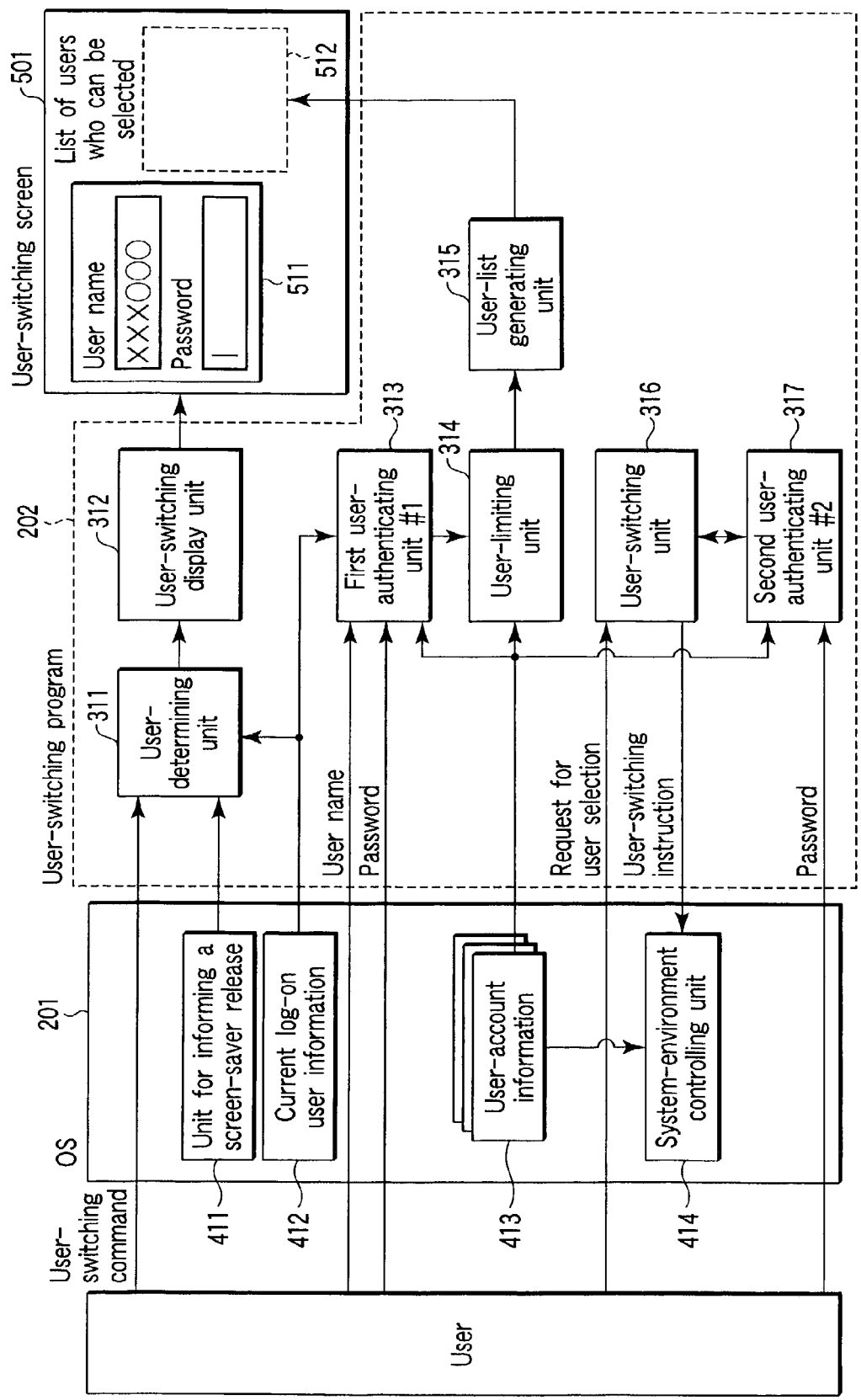
F I G. 2

INFORMATION-PROCESSING APPARATUS HAVING A USER-SWITCHING FUNCTION AND USER-SWITCHING METHOD FOR USE IN THE APPARATUS

CROSS-REFERENCE TO RELATED APPLICATIONS

This application is based upon and claims the benefit of priority from the prior Japanese Patent Application No. 2002-079619, filed Mar. 20, 2002, the entire contents of which are incorporated herein by reference.

BACKGROUND OF THE INVENTION

1. Field of the Invention

The present invention relates to an information-processing apparatus such as personal computer, and a user-switching method for use in the information-processing apparatus.

2. Description of the Related Art

In recent years, a multi-user system is implemented in information-processing apparatuses such as personal computers. The multi-user system enables many users to log on an information-processing apparatus at the same time. The multi-user system performs various functions. One of the functions is known as "user-switching."

The user-switching function switches the user who uses the information-processing apparatus, from the current log-on user to another user, while maintaining the current log-on user in log-on state. Different operation environments of the information-processing apparatus (i.e., screen design, system resource, and the like) are predetermined, respectively for the user accounts that are registered in the apparatus. When the user-switching function is performed, the operation environment of the apparatus is changed, from the operation environment that corresponds to the user account of the current log-on user, to the one that corresponds to the user account of another user. The user-switching function is often called "user-account switching," too.

To implement the user-switching function by using a GUI (Graphical User Interface), the list of all users who can use the information-processing apparatus is displayed. Any person can select one of the users shown in the list displayed. Then, the person can start operating the apparatus in the environment that corresponds to the user selected.

Whenever the list of all users who can use the information-processing apparatus is displayed, however, the users registered in the information-processing apparatus are immediately disclosed. Moreover, the operation environment of the apparatus may inevitably be switched, from the environment of a low-authority user level to that of a high-authority user level, since any person can select any user listed.

Hence, some measures should be taken to protect personal information, while allowing any user of the information-processing apparatus to perform the user-switching function.

BRIEF SUMMARY OF THE INVENTION

Embodiments of the present invention provide an information-processing apparatus and a user-switching method, both can accomplish the switching of user with high security.

According to an embodiment of the invention, there is provided an information-processing apparatus comprising: means for determining an authority level of a user who has demanded user switching; means for displaying on a display of the apparatus a list of users who have authority levels not higher than the determined authority level; and means for switching an operation environment of the apparatus to an operation environment corresponding to a user selected from the list displayed.

Additional embodiments and advantages of the invention will be set forth in the description which follows, and in part will be obvious from the description, or may be learned by practice of the invention. The embodiments and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram illustrating the functions described in the user-switching program that is executed in the computer;

DETAILED DESCRIPTION OF THE INVENTION

Embodiments of the present invention will be described, with reference to the accompanying drawings.

Figure 1:
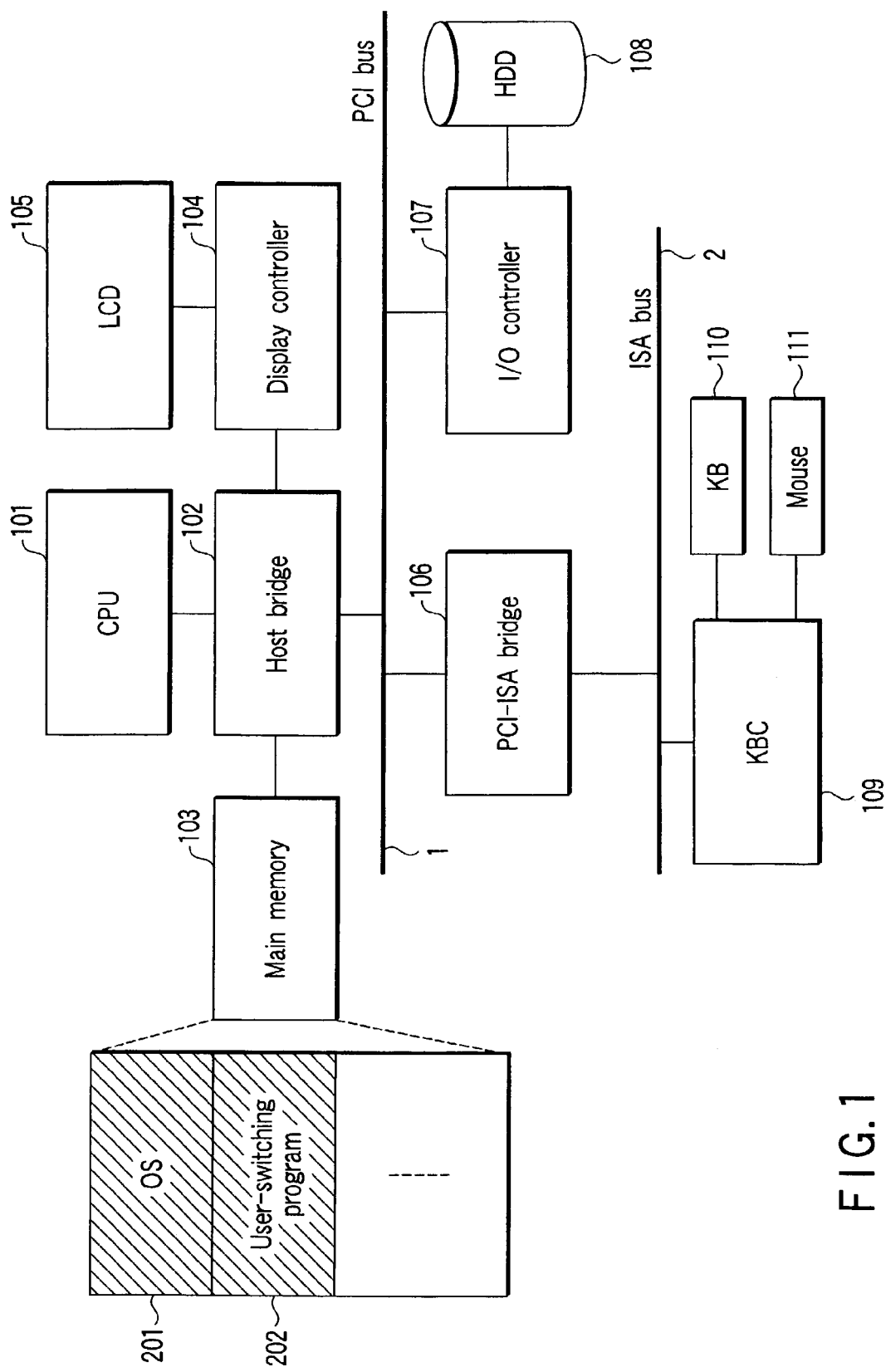
FIG. 1 is a block diagram showing the system configuration of a computer according to an embodiment of the present invention.

FIG. 1 illustrates an information-processing apparatus according to an embodiment of this invention. The information-processing apparatus is, for example, a notebook-type computer. As FIG. 1 shows, the computer comprises a CPU 101, a host bridge 102, a main memory 103, a display controller 104, a liquid crystal display (LCD) 105, a PCI-ISA bridge 106, an I/O controller 107, a hard disk drive (HDD) 108, a keyboard controller (KBC) 109, a keyboard (KB) 110, and a mouse 111.

The CPU 101 is a processor provided to control some of the other components of the computer. The CPU 101 executes an operating system (OS) 201 and application programs that have been loaded from the hard disk drive (HDD) 108 into the main memory 103. The operating system (OS) 201 functions to implement a multi-user system and can manage a plurality of user accounts (i.e., user name, password, network-connection environment, etc.). The OS 201 contains a user-switching program 202, too. The user-switching program 202 cooperates with the OS 201 to perform the user-switching function.

The user-switching function switches the user who uses the computer, from the current log-on user to another user, while maintaining the current log-on user in log-on state. Different operation environments (system environments) of the computer (i.e., screen design, system resource, and the like) are predetermined, respectively for the user accounts that are registered in the OS 201.

When the user-switching function is performed, the operation environment (i.e., screen design, system source used, and the like) is switched, from the operation environment that corresponds to the user account of the current log-on user, to the one that corresponds to the user account of a new current log-on user. The user to whom the first-mentioned user account is assigned is not logged off. Thus, the operation environment preset for this user is maintained in the background. Once logged on, the operation environment for the user remains in the OS 201 until the user logs off.

Thus, user-switching function switches an operation environment of the computer, from the operation environment corresponding to the current log-on user to the operation environment corresponding to the new user.

The host bridge 102 is a bridge device that connects the local bus of the CPU 101 to the PCI bus 1. The display controller 104 controls the LCD 105 that functions as display monitor of the computer. The PCI-ISA bridge 106 is a bridge device that connects the PCI bus 1 and the ISA bus 2 so that data may be transferred between these buses 1 and 2. The PCI-ISA bridge 106 incorporates various system devices such as a system timer, a DMA controller, an interruption controller and the like). The I/O controller 107 comprises an IDE controller and controls the hard disk drive (HDD) 106, the CD-ROM drive and the like. The keyboard controller (KBC) 109 controls the keyboard (KB) 110 and the mouse 111.

<User-Switching Program>

The functions of the user-switching program 202 will be described with reference to FIG. 2.

The user-switching program 202 is activated when a user of the computer demands that the user-switching function be carried out. The user-switching program 202 is activated, too, when the user operates the keyboard 110 or the mouse 111 to stop the screen saver operating on the computer. The screen saver is a program that is executed when the computer enters into idle state. The screen saver is stopped when any user of the computer operates the keyboard 110 or the mouse 111 while the screen saver is being executed. When the screen saver is thus stopped, the user-switching program 202 is activated. The configuration of the program 202 will be described below.

As FIG. 2 depicts, the user-switching program 202 includes a current-user determining unit 311, a user-switching screen display unit 312, a first user-authenticating unit 313, a user-limiting unit 314, a user-list generating unit 315, a user-switching unit 316, and a second user-authenticating unit 317. These units 311–317 are realized in the form of the routines that constitute the user-switching program 202.

When the user-switching program 202 is activated, the current-user determining unit 311 is executed before any other units. The current-user determining unit 311 acquires the current log-on user information 412 from the OS 201 when it receives a message from the OS 201, which indicates that a user has demanded user switching.

The current log-on user information 412 represents the current log-on user who is the person now using the computer. Namely, the term "current log-on user" means one of the users, who dominates the operation environment of the computer at present. The current-user determining unit 311 determines the current log-on user from the current log-on user information 412.

The current-user determining unit 311 also acquires the current log-on user information 412 from the OS 201 when it receives a message from the OS 201, which indicates that the screen saver has been stopped. In this case, too, the unit 311 determines the current log-on user from the current log-on user information 412.

As long as the screen saver is executed, no users can operate the computer. Nonetheless, the operation environment corresponding to the user who has been using the computer immediately before the screen saver is executed remains valid even after the screen saver starts operating. Hence, the current log-on user is the user who has been using the computer immediately before the screen saver is executed. That is, the current log-on user is one who has been dominating the operation environment of the computer until the screen saver is executed.

The name of the current log-on user, who has been determined by the current-user determining unit 311, is sent to the user-switching screen display unit 312. The user-switching screen display unit 312 causes the LCD 105 to display a user-switching screen 501. The user-switching screen 501 is a GUI screen that enables the user who has demanded user switching or the user who stops the screen saver to designate a new user who uses the computer.

The current log-on user determined by the current-user determining unit 311 is not necessarily identical to the user who has demanded the user switching (or the user who has operated the keyboard 110 or the mouse 111 to stop the screen saver). Therefore, the user-switching screen 501 includes an authentication box 511 that requests the user, who has demanded the user switching (or the user who has operated the keyboard 110 or the mouse 111 to stop the screen saver), to input his or her name and password. (Note that the authentication box 511 is also called "authentication window" or "authentication dialog.") Further, the user-switching screen 501 includes a user-list box 512. The list of the users who can be select by the user, who has demanded the user switching (or the user who has operated the keyboard 110 or the mouse 111 to stop the screen saver), has yet to be displayed in the user-list box 512. The user who has demanded the user switching can select any one of the users shown in the list.

The authentication box 511 has a user-name input field for inputting a user-name and a password input field for inputting a password. The user-switching screen display unit 312 inputs the name of the current log-on user, which has been received from the user-determining unit 311, to the user-name input field. The name of the current log-on user is displayed in the user name input field as a default user name of the user who has demanded the user switching.

The user who has demanded the user switching (or has operated the keyboard 110 or the mouse 111 to stop the screen saver) can change, if necessary, the name displayed in the user-name input field to another by operating the keyboard 110.

The first user-authenticating unit 313 determines the user who has demanded the user switching (or has operated the keyboard 110 or the mouse 111 to stop the screen saver) and the authority level of this user, from the user name and password input in the authentication box 511. To authenticate the user, the user-account information 413 managed by the OS 201 is referred to. The user-account information 413 is data that controls the user accounts of the users registered in the computer. (Each user account includes the name, password, authority level, network-connection environment, and the like of each user.) The first user-authenticating unit 313 finds, in the user-account information, the user account that includes the name and password input in the authentication box 511 and acquires the authority level of the user who has this user account.

The OS 201 can manage the following four authority levels of the users:

1. Administrator
2. Power User
3. User
4. Guest User

The administrator is the highest authority level that pertains to administrators. Power User and User are the second highest authority level and the third highest authority level, respectively. The guest user is the lowest authority level.

The data representing the authority level of the user authenticated by the first user-authenticating unit 313 is supplied to the user-limiting unit 314. The user-limiting unit 314 limits the authority levels of users to be selected as a new user by the user who has demanded the user switching, to a specific level or a lower level. The specific authority level is uniquely determined from the authority level of the user (who has demanded the user switching) authenticated by the first user-authenticating unit 313. The specific authority level may be identical to the authority level of the user authenticated by the first user-authenticating unit 313. Hence, if the unit 313 authenticates a user whose authority level is Power User, only Power User, User and Guest User can be selected as a new user who uses the computer.

The user-limiting unit 314 refers to the user-account information 413, selecting, from the users registered in the computer, only the users who have authority levels not higher than the specific authority level. The data representing the users thus selected is supplied from the user-limiting unit 314 to the user-list generating unit 315. The user-list generating unit 315 generates a list of the users selected by the unit 314. The data representing this list is displayed in the user-list box 512 of the user-switching screen 501.

The user-switching unit 316 effects user switching to switch the user of the computer, from the current log-on user to the user selected from those shown in the user list displayed in the user-list box 512. More precisely, when one of the users shown in the box 512 is selected, the user-switching unit 316 instructs the OS 201 to switch the current log-on user to the user selected.

The user-switching instruction contains the name of the user selected from the user list displayed in the user-list box 512. The user-switching instruction is set to the system-environment controlling unit 414 that is provided in the OS 201.

The controlling unit 414 switches the operation environment (i.e., screen design, system resource used, and the like) of the computer, from the operation environment assigned to the current log-on user to the operation environment assigned to the user selected. As a result, the user selected in the process of user switching becomes the current log-on user. Note that the operation environment assigned to each user is defined in the user-account information 413.

The second user-authenticating unit 317 performs the second user authentication, if necessary, before the user-switching unit 316 generates the user-switching instruction. In the second user authentication, a password input window for making the user to input password is displayed in the user-switching screen 501 when a user is selected from the user list displayed in the user-list box 512. The password input is compared with the password of the user selected. If the passwords compared are identical, the user-switching unit 316 is allowed to perform the user switching. Otherwise, if the passwords compared are not identical, the user-switching unit 316 is inhibited from performing the user switching. The second user authentication is carried out when any user who is not logged on the computer, for example, is selected in the user-list box 512.

<User Switching>

A specific example of the user switching will be described, with reference to FIGS. 3 to 6. Assume that two user accounts have been prepared for two users "fnumano" and "mnumano," respectively. User "fnumano" has an authority level of Administrator, and the user "mnumano" has an authority level of User.

Figure 3:
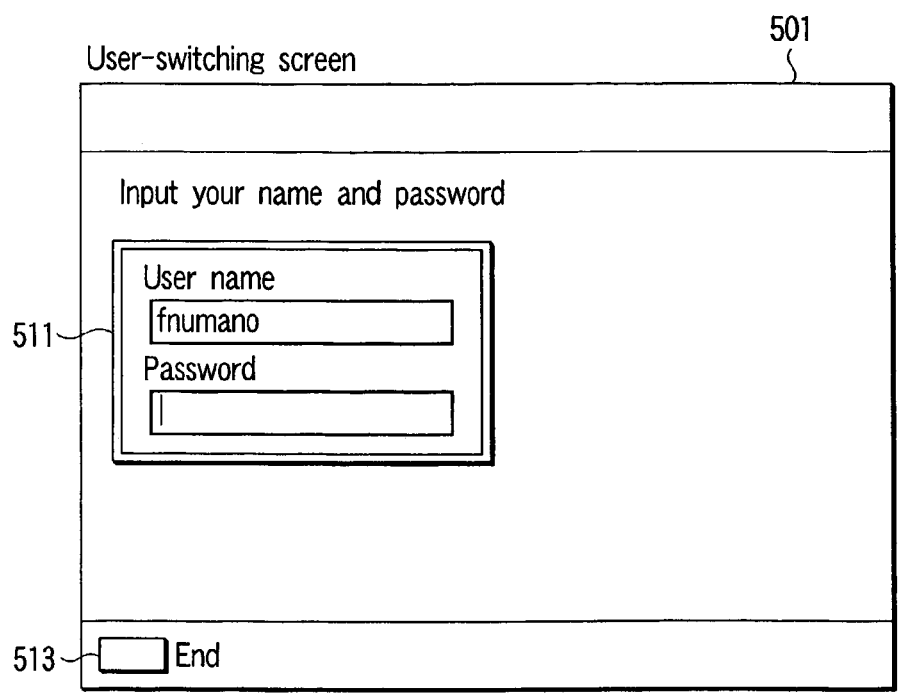
FIG. 3 depicts a user-switching screen used in the computer.

User "fnumano" may be the current log-on user who is now using the computer. If this is the case, the user-switching screen 501 shown in FIG. 3 is displayed when user "fnumano" or any other user operates the keyboard 110 or the mouse 111 to demand user switching. Name "fnumano" of the current log-on user is displayed as a default user name in the user-name input field of the authentication box 511. An end button 513 is displayed in the user-switching screen 501. When the end button 513 is clicked, the OS 201 will be shut down. The user-switching screen 501 is displayed not only when the user switching is demanded, but also when the screen saver is stopped. That is, the screen saver, which is automatically started upon lapse of a preset time after user "fnumano" has left the computer, is stopped when user "fnumano" or any other user operates the keyboard 110 or the mouse 111. Then, the user-switching screen 501 shown in FIG. 3 is displayed. In view of this, the user-switching screen 501 is a start screen of the computer.

Figure 4:
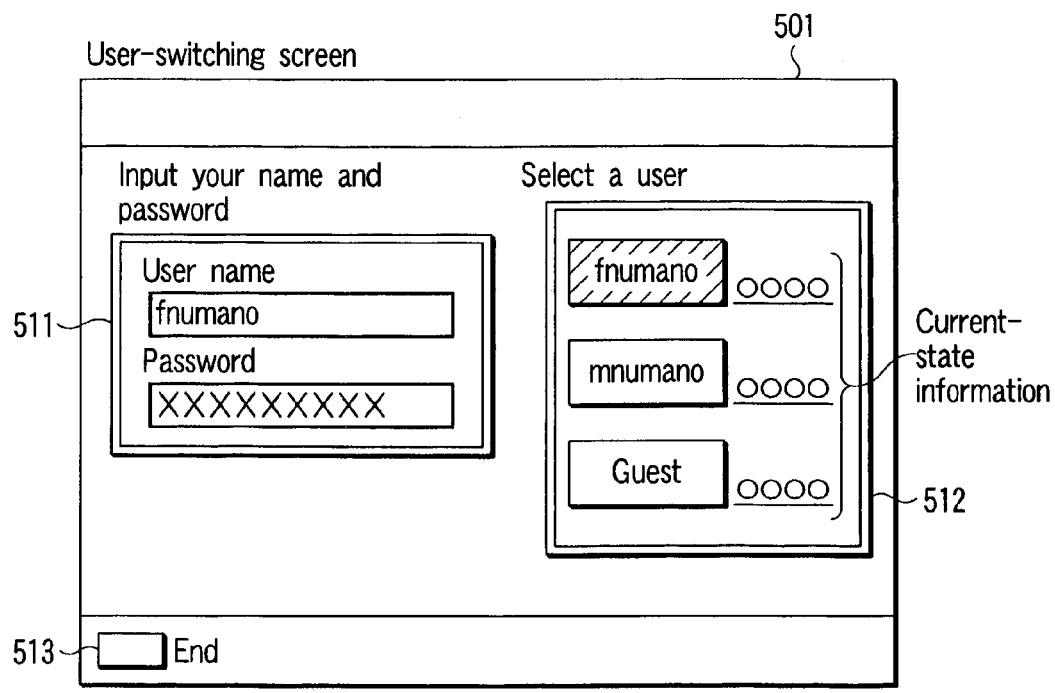
FIG. 4 shows a user list displayed on the user-switching screen used in the computer.

When the password of User "fnumano" is input in the password input field displayed in the authentication box 511, user "fnumano" is verified as the user who has demanded the user switching (or has operated the keyboard 110 or mouse 111 to stop the screen saver). At the same time, the authority level of user "fnumano" is determined to be Administrator. In this case, the user-list box 512 shown in FIG. 4 is displayed on the user-switching screen 501. Since User "fnumano" is Administrator, a list of users who have authority levels equal to or lower than Administrator, i.e., a list of all users who can logged on the computer is displayed in the user-list box 512. That is, a list of all users who are registered in the computer is displayed in the user-list box 512.

If users who can logged on the computer are "fnumano", "mnumano" and Guest user, three user-selecting buttons, "fnumano," "mnumano" and "Guest," which correspond to the three users that can be selected, and three current-state data items about the three users are displayed in the user-list box 512. Each current-state data item indicates whether the user is now logged on and how many programs are being executed if the user is logged on. The user may operate the keyboard 110 or the mouse 111 to select the user-selecting button "fnumano," "mnumano," or "Guest." The user-selecting button, thus selected, changes in color. If the user who has demanded the user switching (or has operated the keyboard 110 or mouse 111 to stop the screen saver) is "fnumano," the user button "fnumano" is selected in default.

Hence, the user "fnumano" need not select the user button "fnumano" to use the computer again. He or she only needs to operate the mouse 111 to make a single click at the user-selecting button "fnumano", or to depress the Enter key of the keyboard 110, to use the computer again. Since the current log-on user and the user selected are coincident, the user switching is not carried out. If the user "fnumano" makes double click at the user-selecting button "mnumano," the user switching is effected, switching the user of the computer from the user "fnumano" to the user "mnumano."

Figure 5:
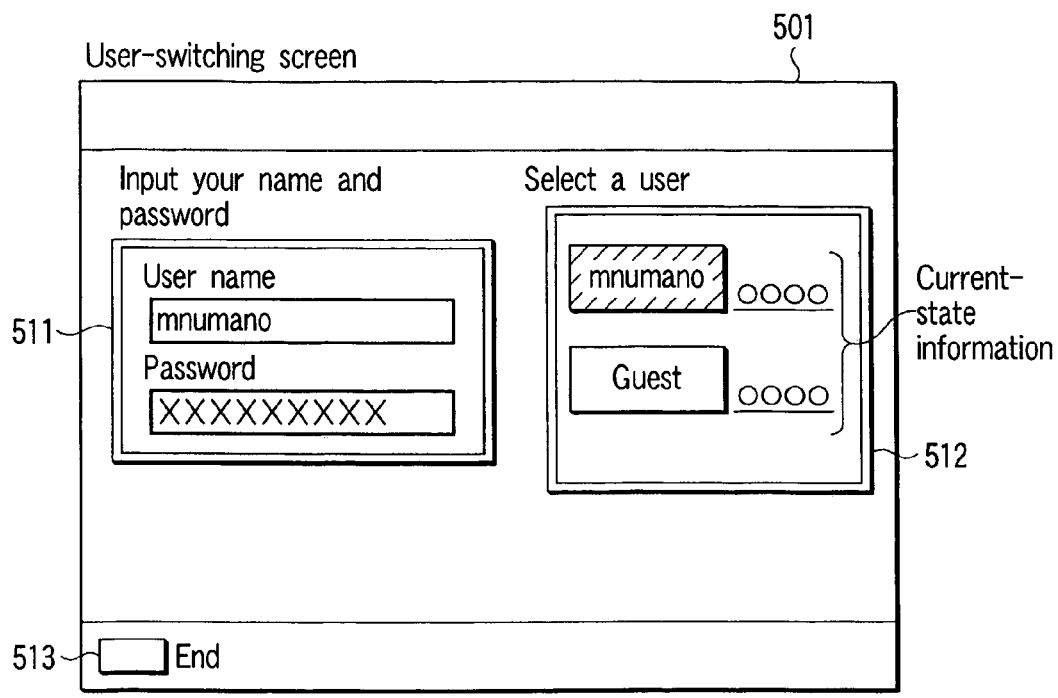
FIG. 5 illustrates a different user list displayed on the user-switching screen used in the computer.

If the name and password of the user "mnumano" may be input in the user-name input field and password input field in the authentication box 511 of the user-switching screen in FIG. 3, it is determined that the user who has demanded the user switching (or has operated the keyboard 110 or mouse 111 to stop the screen saver) is "mnumano" and has the authority level of "User." Such a user-list box 512 as shown in FIG. 5 is then displayed on the user-switching screen 501. Since the user "mnumano" is a general user (User), any users whose authority level is equal to or lower than User are displayed in the user-list box 512. More specifically, only the user "mnumano" and the users having authority level of "Guest" are displayed in the user-list box 512, and the user "fnumano" is not displayed in the box 512. The user "mnumano" can select any one of the users displayed in the box 512, i.e., himself or herself or one of "Guests."

Figure 6:
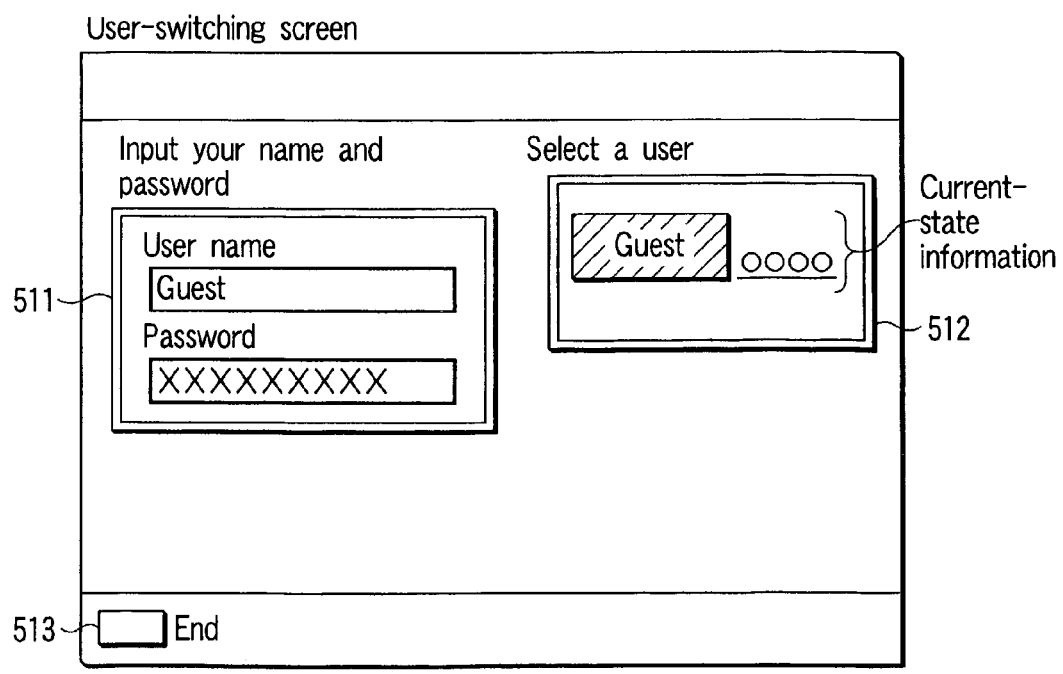
FIG. 6 shows another different user list displayed on the user-switching screen used in the computer.

Assume that the name and password of a user whose authority level is "Guest" are input in the user-name input field and password input filed in the in the authentication box 511 of FIG. 3. Then, the user who has demanded the user switching (or has operated the keyboard 110 or mouse 111 to stop the screen saver) is a guest user. It is therefore determined that this user has authority level of "Guest." Thus, such a user-list box 512 as shown in FIG. 6 is then displayed on the user-switching screen 501. Since the user "Guest" is one who has the lowest authority level, only guest users are displayed in the user-list box 512; neither the user "fnumano" nor the user "mnumano" is displayed in the box 512. The guest user can select only himself or herself or any one of the other guest users registered (e.g., Guest 1 and Guest 2).

<User Switching Effected by User-Switching Program>

Figure 7:
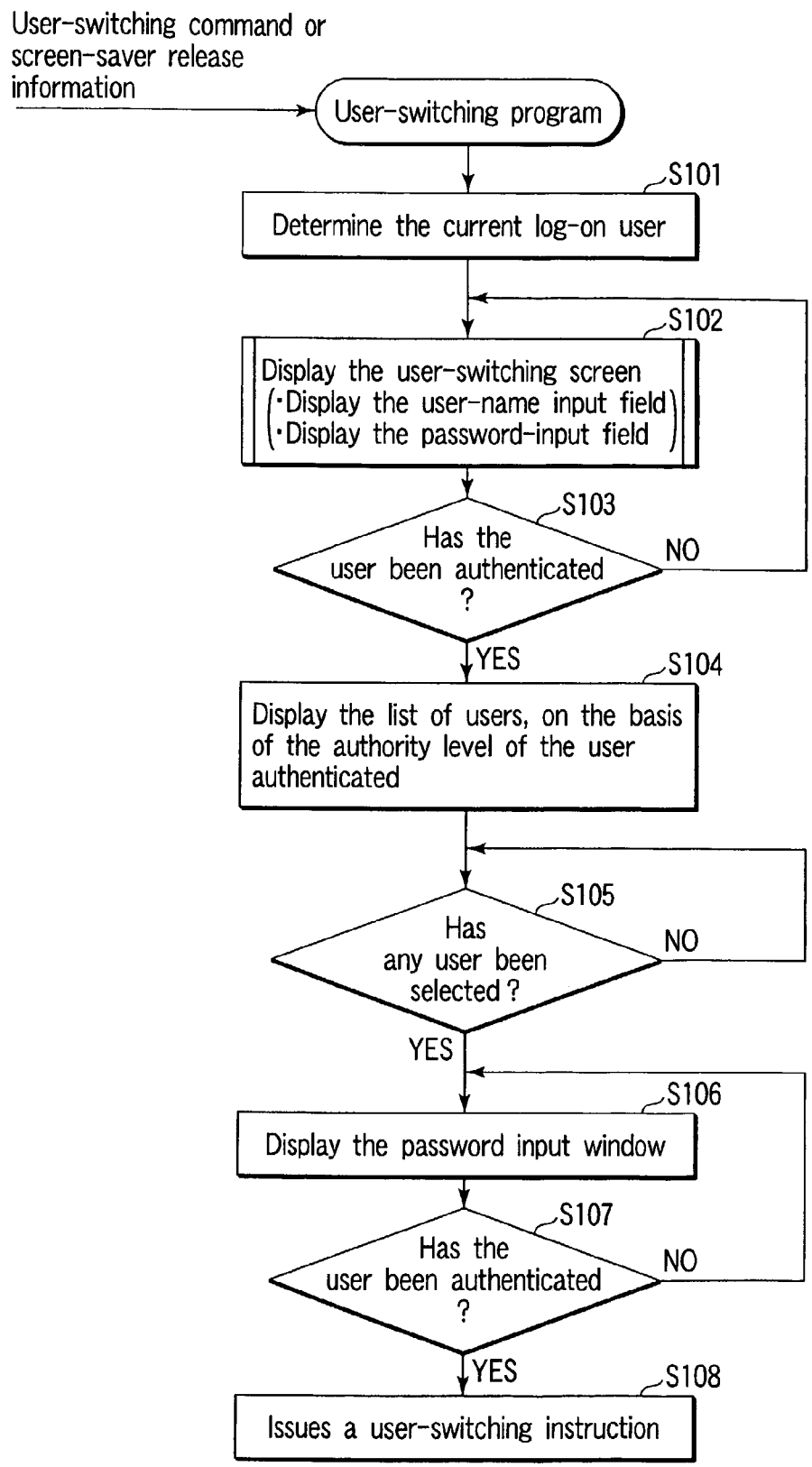
FIG. 7 is a flowchart explaining the sequence of steps described in the user-switching program used in the computer.

How the user-switching program 202 performs the user switching will be explained, with reference to the flowchart of FIG. 7.

As mentioned above, the user-switching program 202 is activated when the user demands the user switching or operates the keyboard 110 or mouse 111 to stop the screen saver. When the user-switching program 202 is thus activated, the current log-on user information 412 is acquired from the OS 201. The current log-on user who is using the computer (thus, dominating the operation environment of the computer) is identified on the basis of the current log-on user information (Step S101). Then, the user-switching screen 501 including the authentication box 511 is displayed (Step S102).

When the name and password of a user are input in the user-name field and password field of the authentication box 511, the user is authenticated on the basis of the name and password input and the user-account information 413 (Step S103). In the user authentication, it is determined whether the user, who has demanded the user switching (or has operated the keyboard 110 or mouse 111 to stop the screen saver), is one registered in the computer. If the user is registered in the computer, his name and his authority level are detected.

If the user is authenticated (if YES at Step S103), that is, if the user who has demanded user switching (or the user who operated the keyboard 110 or the mouse 111 to stop the screen saver) is registered in the computer, the user-list box 512 is prepared on the basis of the authority level determined and is displayed (Step S104). The users shown in the user-list box 512 are users whose authority levels are equal to or lower than the authority level determined at Step S103, among the all users who are registered in the computer.

The process goes to Step S105. At Step S105, it is determined whether any one of the users shown in the user-list box 512 has been selected. If YES at Step S105, a password input window is displayed (Step S106). Then, the user who has demanded user switching (or the user who operated the keyboard 110 or the mouse 111 to stop the screen saver) inputs the password of the user who is selected. It is determined whether the password input and the password of the user selected is identical (Step S107). If YES at Step S107, the process goes to Step S108. At Step S108, the user-switching program 202 issues a user-switching instruction to the system-environment controlling unit 414 of the OS 201. The current log-on user is thereby switched to the user selected. Unless the password input at Step S106 is identical to the password of the user selected, the user switching is not carried out.

<Operation of the System-Environment Controlling Unit>

Figure 8:
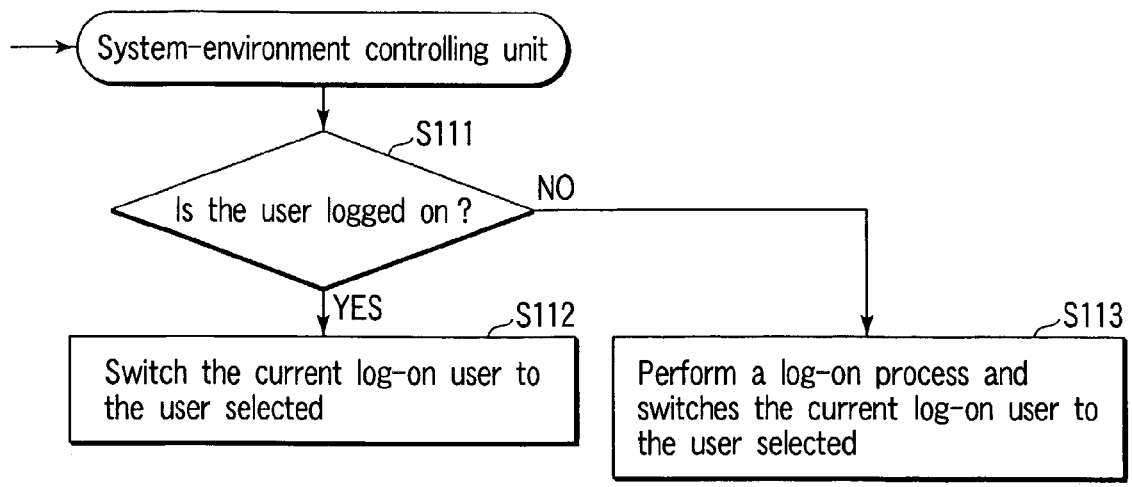
FIG. 8 is a flowchart depicting the sequence of the system-operation environment control performed in the computer.

How the system-environment controlling unit 414 operates will be explained, with reference to the flowchart of FIG. 8.

Upon receipt of a user-switching instruction, the system-environment controlling unit 414 determines whether the user designated by the user-switching instruction is logged on the computer (Step S111). If YES, the process goes to Step S112. At Step S112, the system-environment controlling unit 414 switches the user usable the computer, from the current log-on user to the user selected. The operation environment of the computer is changed from the operating environment of the current log-on user to the operating environment of the user selected.

If NO at Step S111, that is, if the user selected is not logged on the computer, the process goes to Step S113. At Step S113, the system-environment controlling unit 414 first performs the ordinary log-on process such that the user selected is logged on the computer and then switches the operation environment of the computer, from the operation environment of the current log-on user to the operation environment of the new log-on user i.e., the user selected.

<Shutdown of the Operating System>

Figure 9:
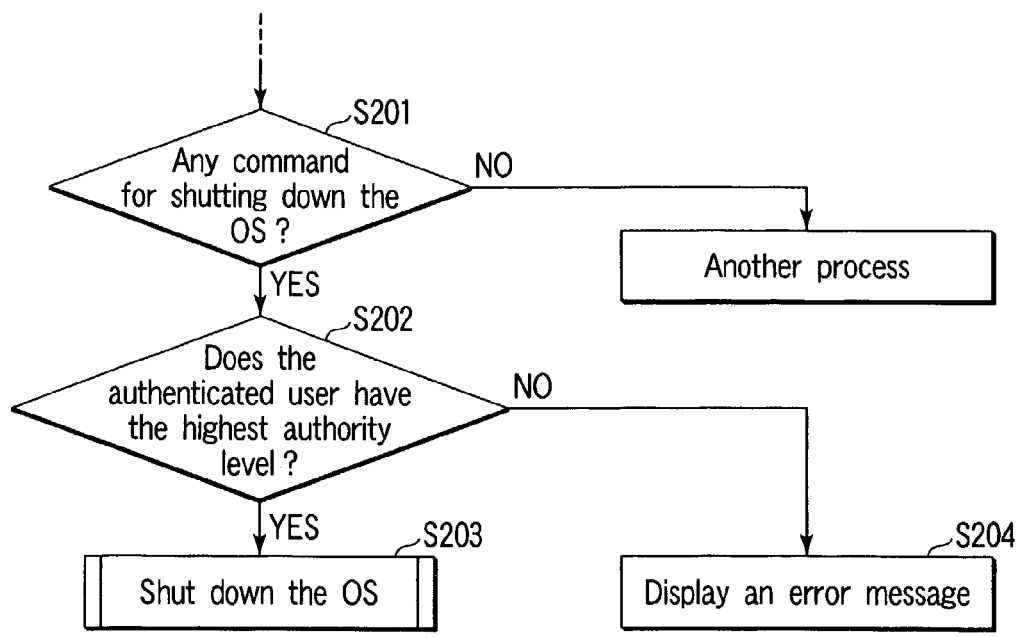
FIG. 9 is a flowchart illustrating the sequence of the shutdown control carried out in the computer.

The process that is effected when the user clicks the end button 513 displayed on the user-switching screen 501 will be described, with reference to the flowchart of FIG. 9.

The user-switching program 202 is designed to authenticate the user who has demanded the user switching (or operated the keyboard 110 or the mouse 111 to stop the screen saver) and determine the authority level of this user. The end button 513 displayed on the user-switching screen 501 may be clicked thereafter. That is, this user may demand that the OS 201 of the computer be shut down (YES at Step S201). In this case, the process goes to Step S202. At Step S202, the user-switching program 202 determines whether the user who has demanded the shutdown is authorized to shown down the computer.

At Step S202, the authority levels of all log-on users who are logged on the computer are at first acquired from the OS 201. It is then determined whether the authority level of the user who has demanded shutdown is higher than that of any log-on user. If YES, the OS 201 is shut down. If NO, the shutdown of the OS 201 is inhibited. Therefore, the OS 201 is shut down even if the user who has demanded the shutdown has an authority level of "User," not Administrator, unless any Power User or any Administrator is logged on at present. In this case, the user-switching program 202 issues a shutdown demand to the OS 201. The OS 201 starts the shutdown process upon receipt of the shutdown demand (Step S203).

At Step S202 the authority level of the user who has demanded the shutdown may not lower than that of any log-on user. If this is the case, the shutdown of the OS 201 is inhibited and the process goes to Step S204. At Step S204, the user-switching program 202 causes the LCD 105 to display an error message on the user-switching screen 501. Thus, the shutdown of the OS 201 is inhibited if any log-on user has an authority level higher than that of the user who has demanded the shutdown.

As has been described, when any user demands the user switching or operates the keyboard or mouse to stop the screen saver, only the user-switching screen 501 including the authentication box 511 is displayed and the user list is not displayed. This prevents unlimited disclosure of the information about the users who are registered in the computer. Moreover, users to be selected by the users demanding the user switching are limited to users who have authority levels equal to or lower than specific authority level. Therefore, displayed in the user-list box 512 are only the users whose authority levels equal to or lower than the specific authority level. Any user whose authority level is higher than that of the user who has demanded the user switching or operated the keyboard or mouse to stop the screen saver, therefore, can be not selected. Thus, the personal information can be protected, while allowing any user of the computer to perform the user-switching function that is useful.

The user switching is performed in accordance with a computer program in the embodiment of the invention. The computer program may be recorded in a computer-readable recording medium. If a recording medium storing the computer program is inserted into any computer of ordinary type and is executed, the same advantage as attained in the embodiment can be attained easily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information-processing apparatus capable of switching a user who uses the apparatus from a current log-on user to another user, while the current log-on user remains logged on, comprising:
   means for determining an authority level of a user who has demanded user switching;
   means for limiting authority levels of users to be selected by the user who has demanded user switching, to a specific authority level, the specific authority level being determined from the authority level for the user who has demanded user switching;
   means for displaying on a display of the apparatus a list of users who have authority levels not higher than the specific authority level, among users who are registered in the apparatus; and
   means for switching the user who uses the apparatus, from the current log-on user to a user selected from the list displayed.

2. The apparatus according to claim 1, further comprising means for displaying on the display an authentication screen that requests a user to input a name and a password, when the user demands the user switching, and
   wherein the determining means includes means for detecting the user who has demanded user switching and the authority level of the user who has demanded user switching, based on the name and password input in the authentication screen.

3. The apparatus according to claim 2, wherein the authentication screen has a user-name input field and a password input field, and
   the determining means includes:
   means for determining the current log-on user; and
   means for displaying the name of the current log-on user determined, as a default user name, in the user name input field of the authentication screen.

4. The apparatus according to claim 1, further comprising means for displaying on the display an authentication screen that requests a user to input a name and a password, when the user operates the apparatus to stop a screen saver being executed in the apparatus, and
   wherein the determining means includes means for detecting the user who has operated the apparatus to stop the screen saver and the authority level of the user who has operated the apparatus, based on the name and password input in the authentication screen; and
   the limiting means includes means for limiting the authority levels of users to be selected by the user who has operated the apparatus to stop the screen saver, to a specific authority level, the specific authority level being determined from the authority level of the user who has operated the apparatus to stop the screen saver.

5. The apparatus according to claim 4, wherein the authentication screen has a user-name input field and a password input field, and
   the determining means includes:
   means for determining the current log-on user; and
   means for displaying the name of the current log-on user determined, as a default user name, in the user name input field of the authentication screen.

6. The apparatus according to claim 1, wherein the switching means includes:
   means for requesting a user to input the password of the user selected from the list displayed; and
   means for switching the user who uses the apparatus, from the current log-on user to the user selected, when the password input is identical to the password of the user selected.

7. The apparatus according to claim 1, further comprising:
   means for determining whether an authority level of a user who has demanded shut down of an operating system being executed in the apparatus is the highest of the authority levels of users who are logged on the apparatus at present; and
   means for shutting down the operating system when the authority level of the user who has demanded the shut down of the operating system is the highest of the authority levels.

8. A method of switching a user who uses an information-processing apparatus from a current log-on user to another user, while the current log-on user remains logged on, the method comprising:

determining an authority level of a user who has demanded user switching;

limiting authority levels of users to be selected by the user who has demanded user switching, to a specific authority level, the specific authority level being determined from the authority level of the user who has demanded user switching;

displaying on a display of the apparatus a list of users who have authority levels not higher than the specific authority level, among users who are registered in the apparatus; and switching the user who uses the apparatus, from the current log-on user to a user selected from the list displayed.

9. The method according to claim 8, further comprising displaying on the display an authentication screen that requests a user to input a name and a password, when the user demands the user switching, and wherein the determining includes detecting the user who has demanded user switching and the authority level of the user who has demanded user switching, based on the name and password input in the authentication screen.

10. The method according to claim 8, further comprising displaying on the display an authentication screen that requests a user to input a name and a password, when a user operates the apparatus to stop a screen saver being executed in the apparatus, and wherein the determining includes detecting the user who has operated the apparatus to stop the screen saver and the authority level of the user who has operated the apparatus, based on the name and password input in the authentication screen, and the limiting includes limiting the authority levels of users to be selected by the user who has operated the apparatus to stop the screen saver, to a specific authority level, the specific authority level being determined from the authority level of the user who has operated the apparatus to stop the screen saver.

11. The method according to claim 8, wherein the switching includes:

requesting a user to input the password of the user selected from the list displayed; and switching the user who uses the apparatus, from the current log-on user to the user selected when the password input is identical to the password of the user selected.

12. The method according to claim 8, further comprising:

determining whether an authority level of a user who has demanded shut down of an operating system being executed in the apparatus is the highest of the authority levels of users who are logged on the apparatus at present; and shutting down the operating system when the authority level of the user who has demanded the shut down of the operating system is the highest of the authority levels.

13. A program recorded in a computer-readable medium and designed to cause a computer to switch a user who uses the computer from a current log-on user to another user, while the current log-on user remains logged on the program comprising:

causing the computer to determine an authority level of a user who has demanded user switching;

causing the computer to limit authority levels of users to be selected by the user who has demanded user switching, to a specific authority level, the specific authority level being determined from the authority level of the user who has demanded user switching;

causing the computer to display on a display of the computer a list of users who have authority levels not higher than the specific authority level, among users who are registered in the apparatus; and causing the computer to switch the user who uses the apparatus, from the current log-on user to a user selected from the list displayed.

14. The program according to claim 13, further comprising causing the computer to display on the display an authentication screen that requests a user to input a name and a password, when the user demands the user switching, and wherein the causing computer to determine the authority level of the user who has demanded user switching includes: causing the computer to detect the user who has demanded user switching and the authority level of the user who has demanded user switching, based on the name and password input in the authentication screen.

15. The program according to claim 13, further comprising causing the computer to display on the display an authentication screen that requests a user to input a name and a password, when a user operates the computer to stop a screen saver being executed in the computer, wherein the causing computer to determine the authority level of the user who has demanded user switching includes: causing the computer to detect the user who has operated the computer to stop the screen saver and the authority level of the user who has operated the computer, based on the name and password input in the authentication screen, and the causing the computer to limit the authority levels of users to be selected includes: causing the computer to limit the authority levels of users to be selected by the user who has operated the computer to stop the screen saver, to a specific authority level, the specific authority level being determined from the authority level of the user who has operated the computer to stop the screen saver.

16. The program according to claim 13, wherein the causing the computer to switch the user who uses the computer includes:

causing the computer to request a user to input the password of the user selected from the list displayed; and causing the computer to switch the user who uses the apparatus, from the current log-on user to the user selected, when the password input is identical to the password of the user selected.

17. The program according to claim 13, further comprising:

causing the computer to determine whether an authority level of a user who has demanded shut down of an operating system being executed in the computer is the highest of the authority levels of users who are logged on the computer at present; and causing the computer to shut down the operating system when the authority level of the user who has demanded the shut down of the operating system is the highest of the authority levels.

* * * * *